No. 768,751. PATENTED AUG. 30, 1904.
C. A. JANSON.
CHURN.
APPLICATION FILED NOV. 4, 1903.
NO MODEL.

Witnesses: Inventor
Ludow Rummler Carl A. Janson
Glen C. Stephens by Rummler & Rummler
Attorneys.

No. 768,751. Patented August 30, 1904.

UNITED STATES PATENT OFFICE.

CARL AUGUST JANSON, OF CHICAGO, ILLINOIS.

CHURN.

SPECIFICATION forming part of Letters Patent No. 768,751, dated August 30, 1904.

Application filed November 4, 1903. Serial No. 179,784. (No model.)

*To all whom it may concern:*

Be it known that I, CARL AUGUST JANSON, a citizen of the United States of America, and a resident of Chicago, in the county of Cook and State of Illinois, have invented certain new and useful Improvements in Churns, of which the following is a specification.

The main objects of my invention are to provide an improved form of churn adapted to quickly and continuously separate butter particles from milk flowing through the churn, to provide improved mechanism for agitating the milk and causing the liberation of butter particles from same, and to provide new means for collecting the butter particles and separating same from the buttermilk. I accomplish these objects by the device shown in the accompanying drawings, in which—

Figure 1:
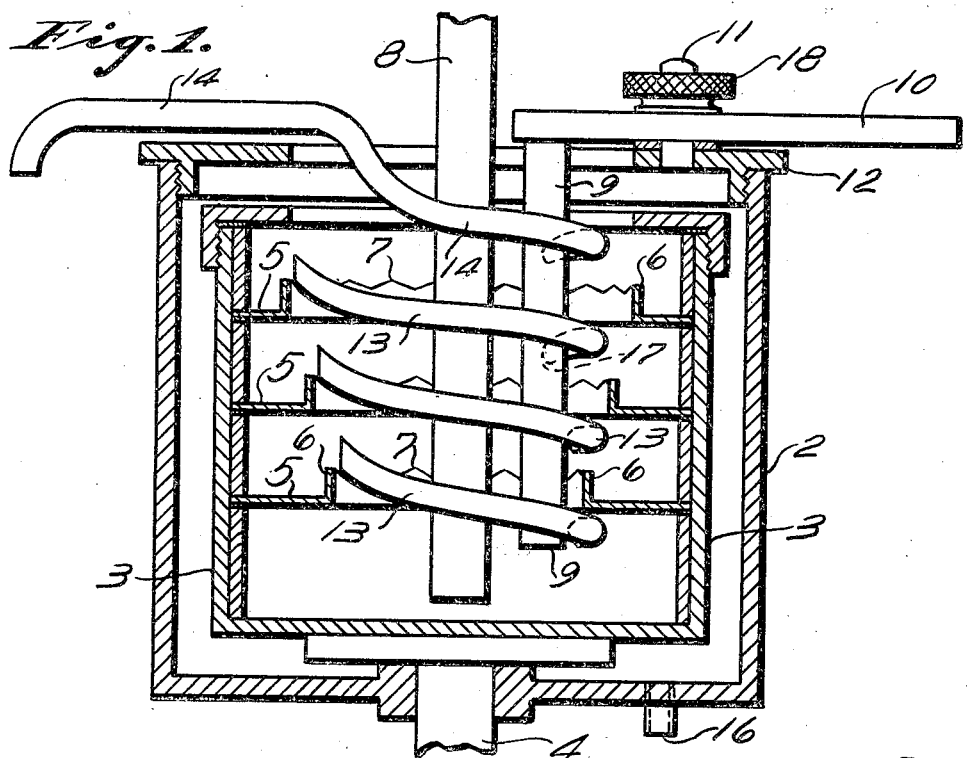
Figure 3:
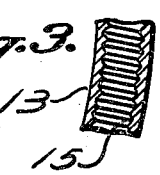
Figure 2:
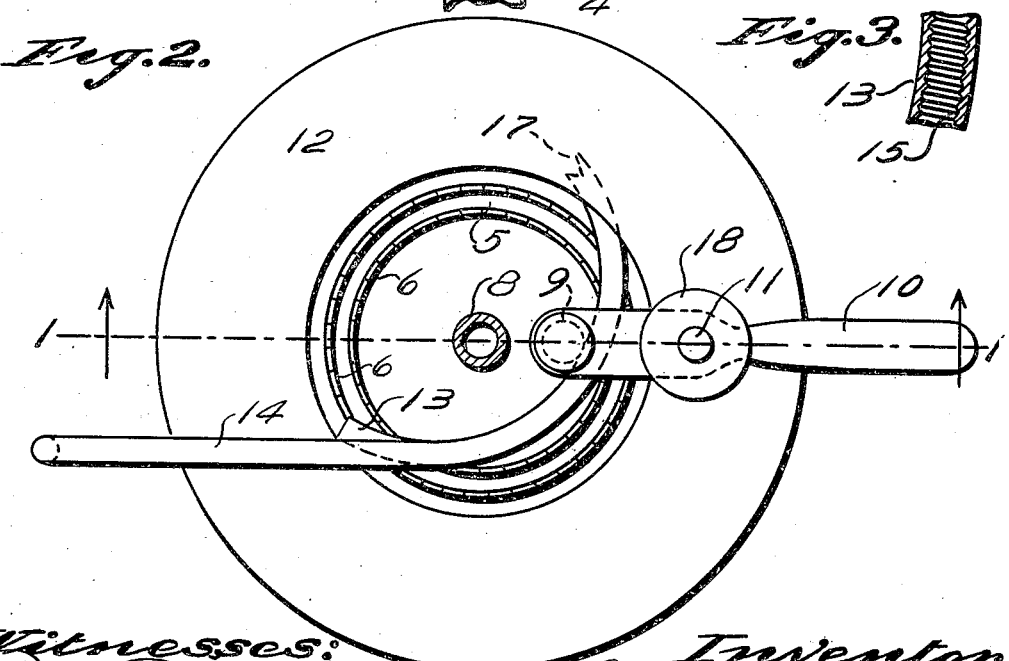

Figure 1 is a vertical section of a churn constructed according to my invention, the driving mechanism being not shown. Fig. 2 is a top plan of the same. Fig. 3 is a longitudinal section, partly broken away, of one of the pipes 13 of Fig. 1, showing the roughened interior of same.

In the construction shown a cylindrical vessel 2 forms part of the rigid frame of the device and has journaled therein on a vertical axis a cylindrical vessel 3, the upper end of which is open and communicates with the interior of the vessel 2. The receptacle 3 is adapted to be rotated through mechanism connected with the shaft 4, but not shown in the drawings. The interior of the receptacle 3 is subdivided by horizontal partitions 5 into a plurality of superimposed compartments. Each of the partitions 5 is provided with a central aperture having a vertically-disposed flange 6 extending around the edges of same and having a plurality of projections 7 around its upper edge. A pipe 8 extends downwardly into the receptacle 3 and is adapted to supply milk to the lowest compartment of same. A vertically-disposed shaft 9 extends into the receptacle 3 at one side of the pipe 8 and is rigidly secured to a lever 10, pivoted at 11 to the cover 12 of the vessel 2 and adapted to be clamped in a fixed position by the knurled nut 18. The shaft 9 has rigidly secured thereto a plurality of spirally-curved pipes 13 and 14. Each of the pipes 13 extends through the central apertures in one of the partitions 5 in suitable manner to conduct a liquid through said partition during the rotation of the receptacle 3 and its contents. The upper pipe 14 extends upwardly through the cover 12 and discharges over the side of the vessel 2. The inner surfaces of the pipes 13 may be roughened, as shown at 15 in Fig. 3, for the purpose of further agitating the liquid during its passage through such pipe. The contents of the vessel 2 are discharged through the pipe 16.

The operation of the device shown is as follows: Assume that cream is continuously supplied through the pipe 8 to the lower compartment of the receptacle 3 while the receptacle 3 is being rapidly rotated by power applied to the shaft 4. The rotation of the receptacle 3 causes rotation of and a corresponding agitation of the milk in the receptacle. This agitation causes the separation of the butter particles from the milk. The watery parts of the milk, being heavier than the butter particles, are thrown outwardly by centrifugal force, while the butter particles float toward the surface of the liquid, which, as is well known, tends to assume a parabolical form in a rotating vessel. The lower ends of each of the pipes 13, being located a considerable distance from the side walls of the receptacle 3, tend to gather liquid, together with the butter particles which accumulate near the middle part of one of the compartments, and conduct same through the partition and toward the outer part of the compartment next above. Here under continued agitation more butter particles are liberated, and the watery parts of the milk again fly outward, while the butter particles are carried by the next pipe into the next succeeding compartment. Any milk which rises through the central apertures in the partitions tends to fly outwardly under centrifugal force and is broken up and further agitated by the projections 7 on the flanges 6. The milk flowing through the pipes 13 is also agitated by the projections 15. The butter particles in the highest compartment, together with the buttermilk, are collected by the pipe 14, and thereby carried out through the cover of the vessel 2. Any liquid leaking over the upper rim of the receptacle 3 is collected by the vessel 2 and drawn off at the waste-pipe 16.

By swinging the lever 10 on its pivot 11 the lower ends 17 of the pipes 13 and 14 are adjusted toward and away from the axis of rotation of the receptacle 3 and may be thus set to conform with the surfaces along which the butter particles tend to accumulate. The form of these surfaces varies with the speed of rotation of the receptacle, but is approximately constant for the same speed and a uniform flow of liquid from the pipe 8.

It will be seen that numerous details of the construction shown may be altered without departing from the spirit of my invention. I therefore do not confine myself to such details except as hereinafter limited in the claims.

What I claim as my invention, and desire to secure by Letters Patent, is—

1. A churn, comprising a receptacle rotatably mounted on a vertical axis; a horizontal partition open at the center and subdividing said receptacle into two communicating compartments; means for continuously supplying liquid to the lower compartment of said receptacle; and an upwardly-disposed edge extending around the opening in said partition, and adapted to agitate a liquid rising through said opening under action of centrifugal force, substantially as described.

2. A churn, comprising a receptacle rotatably mounted on a vertical axis and subdivided by horizontal partitions into a plurality of compartments, each of said partitions having a central aperture through same; and an upwardly-disposed edge extending around each of said apertures and adapted to cause a spraying of liquid rising through such aperture under action of centrifugal force, substantially as described.

3. A churn, comprising a receptacle rotatably mounted on a vertical axis and subdivided by horizontal partitions into a plurality of compartments, each of said partitions having a central aperture through same; an upwardly-disposed edge extending around each of said apertures and adapted to cause a spraying of liquid rising through such aperture under the action of centrifugal force; means for continuously supplying liquid to the lowest compartment of said receptacle; and means for collecting and discharging the contents of the upper compartment during the rotation of said receptacle, substantially as described.

4. A churn, comprising a frame; a receptacle rotatably mounted on a vertical axis in said frame; a horizontal partition extending across said receptacle; a stationary pipe secured to said frame and extending from the middle part of the receptacle below said partition toward the outer part of the receptacle above said partition and adapted through centrifugal force to conduct a liquid upwardly through said partition, said pipe having an uneven inner surface adapted to agitate a liquid passing through same, substantially as described.

5. A churn, comprising a receptacle rotatably mounted on a vertical axis and subdivided by horizontal partitions into a plurality of compartments, each of said partitions having a central aperture through same; and an upwardly-disposed edge extending around each of said apertures and adapted to cause a spraying of liquid rising through such apertures under action of centrifugal force; each of said apertures being successively greater in diameter than the aperture below same, substantially as described.

6. A churn, comprising a receptacle rotatably mounted on a vertical axis and open at the top; a horizontal partition having a central aperture through same; means adapted through centrifugal force to cause a liquid to flow from the middle part of the compartment below said partition to the outer part of the upper compartment; means for continuously feeding milk into the lower compartment of said receptacle; and means for collecting the overflow at the upper end of said receptacle, substantially as described.

7. A churn, comprising a receptacle rotatably mounted on a vertical axis; a horizontal partition open at the center and subdividing said receptacle into two communicating compartments; means for continuously supplying liquid to the lower compartment of said receptacle; and a plurality of projections disposed around the upper edge of the opening through said partition adapted to agitate liquid rising through said opening under the action of centrifugal force, substantially as described.

8. A churn, comprising a frame; a receptacle rotatably mounted on a vertical axis in said frame; a horizontal partition in the receptacle having a central aperture through same; a shaft secured to said frame and extending vertically through said aperture; an inclined pipe secured to said shaft and adapted through centrifugal force to conduct a liquid from the inner part of the compartment below said partition to the outer part of the compartment above same; and means for shifting said shaft laterally for adjusting the lower end of said pipe laterally of the axis of the receptacle, substantially as described.

9. A churn, comprising a frame; a receptacle rotatably mounted on a vertical axis in said frame; a horizontal partition in the receptacle having a central aperture through same; a shaft secured to said frame and extending vertically through said aperture; an inclined pipe secured to said shaft and adapted through centrifugal force to conduct a liquid from the inner part of the compartment below said partition to the outer part of the compartment above same; and means secured to said shaft for shifting said pipe laterally of the axis of the receptacle, substantially as described.

Signed at Chicago this 31st day of October, 1903.

CARL AUGUST JANSON.

Witnesses:
AXEL T. HEDFELDT,
EUGENE A. RUMMLER.